3,736,311
PROCESS FOR IMPROVING THE THERMAL STABILITY OF POLYVINYL ALCOHOL WITH A POLYMERIC POLYCARBOXYLIC ACID
Pallatheri M. Subramanian, Wilmington, Del., assignor to E. I. du Pont de Nemours and Company, Wilmington, Del.
No Drawing. Filed Mar. 2, 1972, Ser. No. 231,363
Int. Cl. C08f 27/16
U.S. Cl. 260—91.3 PV                                6 Claims

ABSTRACT OF THE DISCLOSURE

The thermal stability of polyvinyl alcohol is improved by mixing a sufficient amount of a polymeric polycarboxylic acid such as polyacrylic acid; polymethacrylic acid; copolymers of acrylic acid, methacrylic acid or maleic acid containing more than 10 percent acidic monomer, provided that such copolymers or their salts are water soluble at the specified pH levels; and vinyl methyl ether/maleic anhydride copolymer, with polyvinyl alcohol to convert the alkali metal acetate contained with the polyvinyl alcohol to acetic acid and an alkali metal salt of the polymeric carboxylic acid, such that when the composition is made up as a 10 percent solution in water, the solution has a pH of from about 4.0 to about 4.5.

BACKGROUND OF THE INVENTION

Field of invention

This invention relates to a process for improving the thermal stability of polyvinyl alcohol containing an alkali metal acetate. In particular, it relates to the treatment of such polyvinyl alcohol by the addition of certain polymeric polycarboxylic acids to polyvinyl alcohol.

Prior art

Polyvinyl alcohol is usually prepared by the alkali metal alcoholate catalyzed alcoholysis of an alcoholic solution of a polyvinyl ester, most usually polyvinyl acetate. This process is accompanied with the formation of an alkali metal acetate when polyvinyl acetate is used, some of which adheres to and is contained in the polyvinyl alcohol. In addition, after the alcoholysis reaction is complete, acetic acid is added to the alcoholysis reaction mixture to neutralize its alkalinity. Neutralization of the alkaline reaction mixture occurs with the formation of an alkali metal acetate, some of which again adheres to the polyvinyl alcohol.

Polyvinyl alcohol having an alkali metal acetate associated with it is subject to discoloration in either powder or film form, when it is heated above 100° C., thus, the polyvinyl alcohol is said to have poor thermal stability. It is thought that the presence of the alkali metal acetate in the polyvinyl alcohol is responsible, in large measure, for the color formation. This poor thermal stability renders polyvinyl alcohol more or less unacceptable for many potential applications which involve heat treatments such as the formation of various films, filaments, coatings, laminates and other related articles.

Moreover, when polyvinyl alcohol having an alkali metal acetate associated with it is cast in various film forms, the films, with the passage of time, develop a bloom or haze, in addition to any discoloration which may develop. This bloom or haze is thought to be the result of migration of the alkali metal acetate to the surface of the polyvinyl alcohol film.

Another important use of polyvinyl alcohol is as a textile size. It has been found that, in addition to the undesired color formation, polyvinyl alcohol having an alkali metal acetate associated with it, tends to become water insoluble when heated over 100° C. If the textile material sized with polyvinyl alcohol is to be subjected to the heat treatments involved in many permanent press processes, it is, of course, important that the polyvinyl alcohol be free of adhering alkali metal acetate to prevent undesired color formation (thermal instability) and to insure that the polyvinyl alcohol remains water soluble so that the textile material can be easily desized prior to dyeing.

Various attempts have been made to overcome the problem of thermal instability of polyvinyl alcohol. For example, U.S. Pat. No. 3,220,991 describes a process in which an alcohol-soluble aliphatic polycarboxylic acid, such as itaconic acid, adipic acid, malic acid, and tartaric acid, is added directly to a solution of an alkaline (sodium hydroxide) alcoholyzed polyvinyl ester immediately after the alcoholysis reaction is complete to neutralize the alkaline catalyst. This process, however, requires multiple washings (at least five) of the neutralized polyvinyl alcohol with either methanol or ethanol to remove not only excess neutralization acid, but also other salt by-products of the alcoholysis reaction. These washings make the process costly in terms of production time and alcohol used in the wash.

U.S. Pat. No. 3,156,667 describes a process for improving the thermal stability of polyvinyl alcohol by treating the polyvinyl alcohol with phosphoric acid. However, this process also requires repeated washings of the polyvinyl alcohol with alcohol to remove excess acid and by-product salts. U.S. Pat. 2,785,146 discloses a method for improving the thermal stability of polyvinyl alcohol by adding salts such as zinc sulfate, aluminum sulfate, potassium aluminum sulfate and sodium aluminum sulfate to the polyvinyl alcohol.

These patents teach, in agreement with the statements made above, that the most probable cause of the thermal stability of polyvinyl alcohol can be traced to alkaline reacting salts such as sodium acetate, which are present in the polyvinyl alcohol.

Although not related to the problem of thermal stability, U.S. Pat. No. 2,169,250 should be mentioned here. Polyvinyl alcohol is normally water soluble. Pat. 2,169,250 describes a method for forming films, threads and the like from polyvinyl alcohol which will be insoluble in water and all common solvents. According to the patent, this is accomplished by forming an aqueous solution of polyvinyl alcohol and a compound capable of forming a cross-linked structure with the polyvinyl alcohol such as phthalic acid, terephthalic acid, polymerized acrylic acid and polymerized methacrylic acid; forming this solution into a film or thread; and heating the thus formed structure to a temperature sufficient to cause the polyvinyl alcohol to react with the acid forming a crosslinked structure insoluble in water. In this method, large amounts of the crosslinking compound are required to form the water insoluble polyvinyl alcohol; in fact, it has been determined that to achieve the goal desired by Pat. 2,169,250, i.e. insolubilization of the polyvinyl alcohol, the amount of polycarboxylic acid utilized must be sufficient to provide the resulting polyvinyl alcohol with a pH below 3. As long as the pH of the polyvinyl alcohol is above 3, no insolubilization will occur. The thermal stability of polyvinyl alcohol also decreases at pH values below 3.

It is the principal object of this invention to provide polyvinyl alcohol having improved thermal stability. It is a further object of this invention to improve the thermal stability of polyvinyl alcohol containing an alkali metal acetate by a process which does not impair the water solubility of the polyvinyl alcohol. It is a further object of this invention to improve the thermal stability of polyvinyl alcohol by a process which is simple and economical.

SUMMARY OF THE INVENTION

The method of the present invention comprises, in the preparation of polyvinyl alcohol by alcoholyzing a polyvinyl ester with an alkali metal alcoholate catalyst; neutralizing the resulting alkaline polyvinyl alcohol-containing mixture with acetic acid with the formation of an alkali metal acetate, a portion of which adheres to and is contained in the polyvinyl alcohol; and separating the neutralized polyvinyl alcohol containing adhering alkali metal acetate from the alcoholysis reaction medium, the improvement comprising mixing with the polyvinyl alcohol containing adhering alkali metal acetate a sufficient amount of a polymeric polycarboxylic acid selected from the group consisting of polyacrylic acid; polymethacrylic acid; copolymers of acrylic acid, methacrylic acid or maleic acid containing more than 10 percent acidic monomer, provided that such copolymers or their salts are water soluble at the specified pH levels; and vinyl methyl ether/ maleic anhydride copolymer, to convert substantially all the alkali metal acetate adhering to and contained in the polyvinyl alcohol to acetic acid and an alkali metal salt of the polymeric carboxylic acid, such that when the polyvinyl alcohol is made up as a 10 percent solution in water, the solution has a pH from about 4.0 to about 4.5.

DETAILED DESCRIPTION OF THE INVENTION

As stated above, this invention comprises mixing a polymeric polycarboxylic acid, such as polyacrylic acid; polymethacrylic acid; copolymers of acrylic acid, methacrylic acid or maleic acid containing more than 10 percent acidic monomer, provided that such copolymers of their salts are water soluble at the specified pH levels; and vinyl methyl ether/maleic anhydride copolymer, with neutralized polyvinyl alcohol containing adhering alkali metal acetate to improve the thermal stability of the polyvinyl alcohol.

The polymer polycarboxylic acids are added to the polyvinyl alcohol containing adhering alkali metal acetate in an amount sufficient to convert the alkali metal acetate intimately associated with the polyvinyl alcohol to acetic acid and an alkali metal salt of the polymeric carboxylic acid, such that when the polyvinyl alcohol is made up as a 10 percent solution in water, the solution has a pH of from about 4.0 to about 4.5, preferably 4.3±0.1. The preferred polymeric carboxylic acid is polyacrylic acid.

The term "thermal stability" as used herein refers to the substantially complete lack of color development in polyvinyl alcohol in either powder or film form when subjected to heat treatments involving temperatures above 100° C.

As stated above, it is theorized that color develops in polyvinyl alcohol prepared according to conventional procedures, such as that described in U.S. Pat. 2,734,048, when subjected to heat treatments above 100° C. due to the presence in the polyvinyl alcohol of certain alkali metal acetate salts. These salts are formed when the alkali metal alcoholate catalyzed alcoholysis reaction mixture, in which sodium methylate is the preferred catalyst, is neutralized with acetic acid. Sodium acetate is formed, for example, and is contained in the polyvinyl alcohol when acetic acid is mixed with the alkaline, sodium methylate catalyzed, polyvinyl alcohol reaction mixture to neutralize the alkaline alcoholysis reaction. For sake of convenience, reference herein to the alkali metal acetate salt associated with the acetic acid neutralized polyvinyl alcohol will be limited simply to sodium acetate, and such reference will be understood to include other alkali metal acetate salts.

It is, of course, desirable to remove the sodium acetate from the neutralized polyvinyl alcohol to prevent thermal discoloration. As noted above, one possible manner utilized to remove the undesired sodium acetate from the solid neutralized polyvinyl alcohol is to wash the material with any suitable agent, such as methanol. However, repeated washings are required if sufficient amounts of sodium acetate are to be removed to make the polyvinyl alcohol thermally stable. Generally, polyvinyl alcohol containing a level of from about 0.5% to about 1% of sodium acetate, by weight, based on the weight of the total polyvinyl alcohol can be obtained in commercially feasible washing operations. However, it has been found that a level below 0.05%, by weight, of sodium acetate must be achieved to have a significant improvement in the thermal stability of the polyvinyl alcohol. Thus, the washing procedure does not solve the thermal stability problem.

According to this invention, the problem of thermal stability posed by the presence of sodium acetate in polyvinyl alcohol is eliminated by converting the sodium acetate to a more thermally stable salt through the addition of the polymeric carboxylic acids noted above to the sodium acetate containing polyvinyl alcohol. These acids, it is theorized, react with the sodium acetate intimately associated with the polyvinyl alcohol, forming a more thermally stable salt and acetic acid. For example, assuming the polymeric carboxylic acid to be polyacrylic acid, the reaction expected would be as follows:

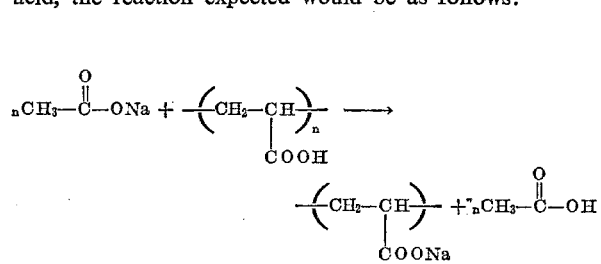

The polyacrylic acid is combined with the sodium acetate containing polyvinyl alcohol in excess of the amount required simply to convert the sodium acetate to acetic acid, the polyacrylic acid being converted to the partial sodium salt of polyacrylic acid. This salt is thermally stable and the acetic acid poses no problem of thermal instability. In addition, the polymeric carboxylic acid and the salt formed in the reaction with the sodium acetate are compatible with the polyvinyl alcohol. Thus, films formed from treated polyvinyl alcohol will not bloom or haze due to migration of these compounds to the surface of the film. Moreover, the solubility of the polyvinyl alcohol in water is not affected by the treatment with the polymeric carboxylic acids.

The polymeric polycarboxylic acids may be combined with the neutralized polyvinyl alcohol in either solid or solution form; likewise, the neutralized polyvinyl alcohol may be in either finely-divided form or in solution when combined with the polymeric polycarboxylic acids. It has been found, however, that the most appropriate point in the usual polyvinyl alcohol production process for the addition of the polymeric polycarboxylic acids is to the acetic acid-neutralized polyvinyl alcohol after it has been separated as a finely-divided solid from the alkaline alcoholysis reaction mixture in any convenient manner such as by filtration. The polymeric carboxylic acid can be dissolved in an alcohol solvent, preferably methanol, and added to the neutralized polyvinyl alcohol or, as is preferred, the acid can be added in dry form to a wet filter cake of the neutralized polyvinyl alcohol which has been washed with an alcohol such as methanol. In this manner, the polymeric polycarboxylic acid is solubilized by the alcohol remaining in the filter cake and a minimum amount of the polymeric polycarboxylic acid is required since some of the sodium acetate will have been removed by the washing. When dry blends of neutralized polyvinyl alcohol and polymeric polycarboxylic acid are combined, the blend is preferably dissolved in water for the polyvinyl alcohol treatment.

No special temperature or time requirements are necessary for the polymeric polycarboxylic acid treatment.

After addition of the polymeric polycarboxylic acid to the wet polyvinyl alcohol filter cake, the filter cake is dried, producing thermally stable polyvinyl alcohol. If desired, although not required, the filter cake can be washed with alcohol after the polymeric polycarboxylic acid treatment, prior to drying.

Drying of the polymeric polycarboxylic acid treated polyvinyl alcohol is accomplished by heating the polyvinyl alcohol to a temperature of from about 60° C. to about 100° C. at atmospheric pressure, or at a temperature of from about 25° C. to about 50° C. under reduced pressure.

Treatment of the neutralized polyvinyl alcohol with a polymeric polycarboxylic acid to convert the undesired sodium acetate to acetic acid and an alkali metal salt of the polymeric polycarboxylic acid, has no adverse effects on the other desirable qualities of polyvinyl alcohol; that is, the film-forming properties, rate of solution, and the temperature required for solution in water. For example, the solubility characteristics of the polyvinyl alcohol or the resultant heat-treated or air-dried films of polyvinyl alcohol are not adversely affected by the treatment with the polymeric polycarboxylic acids.

The polyvinyl alcohol treated with a polymeric polycarboxylic acid in accordance with this invention is prepared by known methods, as stated above, one method being that described in U.S. Pat. 2,734,048, the contents of which are incorporated herein by reference. The polyvinyl ester utilized in this invention may be derived from a carboxylic acid containing from 1 to 4 carbon atoms such as formic, acetic, propionic, or butyric acid. The polyvinyl ester, e.g., polyvinyl acetate, is alcoholyzed with a monohydroxy saturated aliphatic alcohol containing from 1 to 4 carbon atoms, such as methanol, ethanol, propanol, and butanol, preferably methanol.

The alcoholysis of the polyvinyl ester is aided by the presence of an anhydrous alkali metal alcoholate catalyst, preferably sodium methylate, although other alkali metal alcoholates, e.g., potassium ethylate, lithium butylate, sodium propylate, sodium butylate, sodium decylate, and the like, may be used as the catalyst. The catalyst is utilized in a concentration of from about 0.1% to about 5%, preferably from about 0.2% to about 0.5% by weight, based on the weight of the reaction mixture.

The alcoholysis reaction is preferably carried out in an apparatus consisting of multiple reaction vessels connected in series such that the effluent from the first reaction vessel flows into the second reaction vessel, and the effluent from the latter is treated to recover the polyvinyl alcohol therefrom. Such an apparatus is defined with more specificity in U.S. Pat. 2,734,048.

An alternate continuous process for the production of polyvinyl alcohol that gives thermally stable haze free films comprises continuous filtration of the alkaline polyvinyl acetate hydrolysate (before neutralization), washing the cake on the filter continuously with ½ to 1½ pounds methanol per pound product, then washing on the continuous filter with about 1 pound 85/15/5 methyl acetate/methanol/water per pound of product, said final wash containing about 0.1–4% polycarboxylic acid or its ammonium salt, preferably 0.5–1% fumaric acid or the like, for neutralization to give a heat stable low ash product.

The following examples are included to illustrate the above-described invention in detail:

EXAMPLE 1

One hundred grams of substantially completely hydrolyzed polyvinyl alcohol containing 1.0% by weight sodium acetate is blended with vinyl methyl ether/maleic anhydride copolymer (available from the GAF Corporation under the name Gantrez® AN–169) in varying amounts as set forth in Table I below. The dry blends of the polyvinyl alcohol and the vinyl methyl ether/maleic anhydride copolymer are then dissolved in water with agitation and heating to give solutions containing 10% by weight of the polymer blend. These solutions have varying pH values as set forth in Table I. Films of these materials are then heated in an air circulating oven at 150° C. for one hour. The films developed the yellowness values set forth in Table I as measured by a "Colormaster" differential colorimeter, Model 4, made by Manufacturers Engineering and Equipment Corporation, Hatboro, Pa. The percent yellow is determined by measuring the reflectance-transmittance of the films at "G" (green), "R" (red) and "B" (blue) and calculating the yellowness value (YI-C) from the following equation:

$$YI\text{-}C = \frac{\overline{R} - \overline{B}}{G} \times 100$$

wherein $\overline{R}$ = reflectance-transmission in percent.
$\overline{B}$ = reflectance-transmission in percent.
$G$ = reflectance-transmission in percent.
YI-C = yellowness index color.

It will be noted that when the polyvinyl alcohol is treated with the vinyl methyl ether/maleic anhydride copolymer the percent yellow of aqueous solutions of polyvinyl alcohol is not significantly reduced until the resultant aqueous solutions of polyvinyl alcohol have a pH value of between about 4.5 and about 4.2 and that the percent yellow of aqueous solutions of the polyvinyl alcohol begins to increase as the pH of the solutions fall below 4.

TABLE I.—THERMAL STABILITY OF POLYMERIC POLY CARBOXYLIC ACID TREATED POLYVINYL ALCOHOL

| Additive | Wt. percent | pH of 10% aqueous solution | Film color, percent yellow (Colormaster) |
|---|---|---|---|
| None | | 6.05 | 87.7 |
| Vinyl methyl ether/maleic anhydride copolymer | 0.1 | 5.90 | 98.1 |
| Do | 0.5 | 5.40 | 71.8 |
| Do | 1.0 | 4·82 | 39.5 |
| Do | 2.0 | 4.54 | 1.5 |
| Do | 3.0 | 4.27 | 1.05 |
| Do | 5.0 | 3.95 | 1.9 |

EXAMPLE 2

One hundred grams of substantially completely hydrolyzed polyvinyl alcohol containing 1% by weight sodium acetate is dissolved in 900 g. of water to give a 10% solution. The solution is divided into 100 g. aliquots and used in the following tests, the results being tabulated in Table II. One aliquot is untreated and six aliquots are mixed with a 15% aqueous solution of polyacrylic acid having a molecular weight of approximately 200,000 in varying amounts as set forth in Table II. Wet films of about 15 mil thickness are cast on polymethyl methacrylate plates and air dried at room temperature. The dried films, about 1.5 mils in thickness, are placed in an air circulating oven at 150° C. for four hours after which they are measured for percent yellow in the differential colorimeter following the procedure set forth in Example 1. The results, shown in Table II, demonstrate improved thermal stability obtained with polymethacrylic acid and also demonstrate that optimum thermal stability is obtained at a pH of the aqueous solution of 4.3±0.1. Furthermore, it is observed that samples at pH values below 3 would not redissolve in water after heating at 150° C. for one hour. Samples of air dried unheated films were stored at varying relative humidities of 0, 50 and 100% at 75° F. for two weeks with the observation that slight haze developed in all films at pH above 4.6 and no haze developed in films at pH values between 4.6 and 4.0.

EXAMPLE 3

Fifteen hundred grams of polyvinyl alcohol filter cake containing approximately 45% by weight solids (99% polyvinyl alcohol and 1% sodium acetate), 23% methyl acetate and 32% methanol obtained from the alcoholysis of polyvinyl acetate are divided into 100 g. aliquots. One aliquot is vacuum dried untreated at 55° C. and six others are mixed with varying amounts of a 2% solution of polyacrylic acid (200,000 molecular weight) in methanol to obtain the compositions indicated in Table III. All these aliquots are vacuum dried at 55° C. The samples shown in Table III are dissolved in water as 10% solutions, cast as 15 mil wet films on polymethylmethacrylate plates, air dried at 25–30° C. then subjected to thermal stability and haze tests, the results being tabulated in Table III. These results indicate that polyacrylic acid is equally effective to improve the thermal stability of polyvinyl alcohol when added to solvent (methanol) containing polyvinyl alcohol as when added to an aqueous solution of polyvinyl alcohol.

TABLE III.—THERMAL STABILITY OF POLYMERIC ACRYLIC ACID TREATED POLYVINYL ALCOHOL

| Additive | Wt. percent [1] | pH of 10% aqueous solution [2] | Film color, percent yellow [3] | Haze [4] | | |
|---|---|---|---|---|---|---|
| | | | | R.H. 0 | R.H. 50 | R.H. 100 |
| None | | 6.0 | 92.0 | Nil | Sl | Sl |
| Polyacrylic acid [5] | 0.5 | 5.6 | 85.0 | Nil | Sl | Sl |
| Do.[5] | 1.0 | 4.9 | 68.0 | Nil | Sl | Sl |
| Do.[5] | 1.5 | 4.8 | 35.0 | Nil | Sl | Sl |
| Do.[5] | 2.0 | 4.6 | 18.0 | Nil | Trace | Trace |
| Do.[5] | 2.5 | 4.4 | 1.4 | Nil | Nil | Nil |
| Do.[5] | 3.0 | 4.1 | 3.5 | Nil | Nil | Nil |

[1] Wt. percent based on total weight of polyvinyl alcohol and polyacrylic acid.
[2] pH at 25° C.
[3] Film color measured on "Colormaster" differential colorimeter, after 1.5 mil thick film (cast from 10% aqueous solution and air dried at room temperature) was exposed to 150° C. in air circulating oven for four hours.
[4] Haze development of 1.5 mil thick air dried film at 0%, 50% and 100% relative humidity (R.H.) at 75° F. after two weeks.
[5] Polyacrylic acid (Goodrite K 714 from B. F. Goodrich Chemical Company). M.W.= 200,000; 15% solution in water; pH 2.5 at 25° C.

Nil.=none; Trace=very slight; Sl.=slight.

TABLE II.—THERMAL STABILITY OF POLYMERIC ACRYLIC ACID TREATED POLYVINYL ALCOHOL

| Additive | Wt. percent [1] | pH of 10% aqueous solution [2] | Film color, percent yellow [3] | Haze [4] | | |
|---|---|---|---|---|---|---|
| | | | | R.H. 0 | R.H. 50 | R.H. 100 |
| None | | 6.3 | 95.0 | Nil | Nil | Nil |
| Polyacrylic acid [5] | 0.5 | 5.7 | 92.0 | Nil | Sl | Sl |
| Do.[5] | 1.0 | 5.0 | 80.0 | Nil | Sl | Sl |
| Do.[5] | 1.5 | 4.9 | 70.0 | Nil | Sl | Sl |
| Do.[5] | 2.0 | 4.7 | 25.0 | Nil | Sl | Sl |
| Do.[5] | 2.5 | 4.3 | 1.5 | Nil | Nil | Nil |
| Do.[5] | 3.0 | 4.0 | 4.0 | Nil | Nil | Nil |

[1] Wt. percent based on total weight of polyvinyl alcohol and polyacrylic acid.
[2] pH at 25° C.
[3] Film color measured on "Colormaster" differential colorimeter, after 1.5 mil thick film (cast from 10% aqueous solution and air dried at room temperature) was exposed to 150° C. in air circulating oven for four hours.
[4] Haze development of 1.5 mil thick air dried film at 0%, 50% and 100% relative humidity (R.H.) at 75° F. after two weeks.
[5] Polyacrylic acid (Goodrite K 714 from B. F. Goodrich Chemical Company). M.W.=200,000; 15% solution in water; pH 2.5 at 25° C.

Nil.=none; Sl.=slight.

EXAMPLE 4

Fifteen hundred grams of polyvinyl alcohol filter cake containing approximately 45% by weight solids (99% polyvinyl alcohol and 1% sodium acetate), 23% methyl acetate and 32% methanol obtained from the alcoholysis of polyvinyl acetate are divided into 100 g. aliquots, one of which was vacuum dried at 55° C., and six others were mixed with varying amounts of a 2% solution of polymethacrylic acid (approximately 200,000 molecular weight) in methanol to obtain compositions indicated in Table IV. All these aliquots are vacuum dried at 55° C. The samples shown in Table IV are dissolved in water as 10% solutions, cast as 15 mil wet films on polymethyl methacrylate plates, air dried at 25–30° C. then subjected to thermal stability and haze tests the results being tabulated in Table IV. These results show that maximum thermal stability is obtained when the ratio of polymethacrylic acid to sodium acetate is such as to give a pH of 4.3±0.1. Furthermore, haze resistance is at maximum when the pH of the mixture is 4.3 or lower. It was observed that the films, after the thermal stability tests, remained soluble in water only when the pH of the polyvinyl alcohol was in the range of 4.0 to 5.0.

TABLE IV.—THERMAL STABILITY OF POLYMETHACRYLIC ACID TREATED POLYVINYL ALCOHOL

| Additive | Wt. percent [1] | pH of 10% aqueous solution [2] | Film color, percent yellow [3] | Haze [4] | | |
|---|---|---|---|---|---|---|
| | | | | R.H. 0 | R.H. 50 | R.H. 100 |
| None | | 6.2 | 89.0 | Nil | Sl. | Sl. |
| Polymethacrylic acid [5] | 0.5 | 5.5 | 78.0 | Nil | Sl. | Sl. |
| Do.[5] | 1.0 | 5.0 | 58.0 | Nil | Sl. | Sl. |
| Do.[5] | 1.5 | 4.9 | 25.6 | Nil | Sl. | Sl. |
| Do.[5] | 2.0 | 4.7 | 15.3 | Nil | Trace | Trace. |
| Do.[5] | 2.5 | 4.3 | 1.2 | Nil | Nil | Nil. |
| Do.[5] | 3.0 | 4.0 | 4.0 | Nil | Nil | Nil. |

[1] Wt. percent based on total weight of polyvinyl alcohol and polymethacrylic acid.
[2] pH at 25° C.
[3] Film color measured on "Colormaster" differential colorimeter, after 1.5 mil thick film was exposed to 150° C. in air circulating oven for four hours.
[4] Haze development of 1.5 mil thick film stored at 0%, 50% and 100% relative humidity (R.H.) at 75° F. after two weeks.
[5] Polymethacrylic acid (approximately 200,000 molecular weight), pH of 10% aqueous solution at 25° C.=2.3.

Nil=none; Trace=very slight; Sl.=slight.

I claim:
1. In the preparation of polyvinyl alcohol which comprises (1) alcoholyzing a polyvinyl ester with an alkali metal alcoholate catalyst, (2) neutralizing the resulting alkaline polyvinyl alcohol-containing reaction mixture with acetic acid with the formation of an alkali metal acetate, a portion of which adheres to and is contained in the polyvinyl alcohol, and (3) separating the neutralized polyvinyl alcohol containing adhering alkali metal acetate from the alcoholysis reaction mixture, the improvement comprising mixing with the polyvinyl alcohol containing adhering alkali metal acetate a sufficient amount of a polymeric polycarboxylic acid selected from the group consisting of polyacrylic acid; polymethacrylic acid; copolymers of acrylic acid, methacrylic acid or maleic acid containing more than 10% acidic-monomer, provided that such copolymers or their salts are water soluble at the specified pH levels; and vinyl methyl ether/maleic anhydride copolymer, to convert substantially all the alkali metal acetate contained in the polyvinyl alcohol to acetic acid and an alkali metal salt of the polymeric polycarboxylic acid, such that when the polyvinyl alcohol is made up as a 10% solution in water, the solution has a pH of from about 4.0 to about 4.5.

2. The method of claim 1 wherein the polyvinyl alcohol containing adhering alkali metal acetate salt is separated from the alcoholysis reaction mixture by filtration, and the polymeric polycarboxylic acid is mixed with the polyvinyl alcohol filter cake.

3. The method of claim 2 wherein the polyvinyl alcohol filter cake is washed with methanol prior to the addition of the polymeric polycarboxylic acid.

4. The method of claim 1 wherein the alkali metal alcoholate catalyst is sodium methylate and the alkali metal acetate adhering with the polyvinyl alcohol is sodium acetate.

5. The method of claim 1 wherein the polymeric polycarboxylic acid is added in an amount sufficient such that when the polyvinyl alcohol is made up as a 10% solution in water, the solution has a pH of about 4.3±0.1.

6. The method of claim 5 wherein the polymeric polycarboxylic acid is polyacrylic acid.

References Cited
UNITED STATES PATENTS

| | | | |
|---|---|---|---|
| 2,169,250 | 8/1939 | Izard | 18—54 |
| 2,734,048 | 2/1956 | Bristol et al. | 260—91.3 |
| 2,785,146 | 3/1957 | Davies et al. | 260—45.75 |
| 3,156,667 | 11/1964 | Martins | 260—45.7 |
| 3,220,991 | 11/1965 | Martins | 260—91.3 |

JOSEPH L. SCHOFER, Primary Examiner
S. M. LEVIN, Assistant Examiner

U.S. Cl. X.R.
260—89.1, 91.3 VA